United States Patent
Kimura et al.

(10) Patent No.: US 10,176,490 B2
(45) Date of Patent: Jan. 8, 2019

(54) ADVERTISEMENT DISTRIBUTION SYSTEM, ADVERTISEMENT DISTRIBUTION CONTROL APPARATUS, AND ADVERTISEMENT DISTRIBUTION CONTROL METHOD

(71) Applicant: YAHOO JAPAN CORPORATION, Tokyo (JP)

(72) Inventors: Kazutaka Kimura, Tokyo (JP); Kanta Suzuki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 698 days.

(21) Appl. No.: 14/488,801

(22) Filed: Sep. 17, 2014

(65) Prior Publication Data

US 2015/0269608 A1   Sep. 24, 2015

(30) Foreign Application Priority Data

Mar. 20, 2014   (JP) .................................. 2014-058318

(51) Int. Cl.
   G06Q 30/02   (2012.01)
(52) U.S. Cl.
   CPC ..... G06Q 30/0244 (2013.01); G06Q 30/0254 (2013.01)
(58) Field of Classification Search
   CPC ........................... G06Q 30/0241; G06Q 30/02
   See application file for complete search history.

(56) References Cited

U.S. PATENT DOCUMENTS

| | | | |
|---|---|---|---|
| 2002/0078441 A1* | 6/2002 | Drake | H04N 7/17318 725/9 |
| 2003/0126595 A1* | 7/2003 | Sie | G06Q 30/02 725/29 |
| 2005/0102696 A1* | 5/2005 | Westberg | H04N 5/44543 725/46 |
| 2008/0098290 A1* | 4/2008 | Williams | G06F 9/4443 715/209 |
| 2009/0043649 A1* | 2/2009 | Wright | G06Q 30/02 705/14.69 |

(Continued)

FOREIGN PATENT DOCUMENTS

| JP | 2002-354446 A | 12/2002 |
|---|---|---|
| JP | 2003-242372 A | 8/2003 |

(Continued)

OTHER PUBLICATIONS

Mar. 29, 2016 Office Action issued in Japanese Patent Application No. 2014-058318.

(Continued)

Primary Examiner — Vincent M Cao
(74) Attorney, Agent, or Firm — Oliff PLC

(57) ABSTRACT

An advertisement distribution control apparatus according to an embodiment includes a view count determination unit and a distribution/non-distribution decision unit. The view count determination unit determines the number of views of content information being distributed. The distribution/non-distribution decision unit decides whether or not to distribute advertisement information to terminal apparatuses viewing the content information based on the number of views determined by the view count determination unit.

14 Claims, 12 Drawing Sheets

(56) References Cited

U.S. PATENT DOCUMENTS

2012/0054020 A1* 3/2012 Jacobs .............. G06Q 30/0269
705/14.42
2013/0305273 A1* 11/2013 Hadfield .......... H04N 21/44204
725/14

FOREIGN PATENT DOCUMENTS

| JP | 2005-196777 A | 7/2005 |
|----|---------------|--------|
| JP | A-2012-526321 | 10/2012 |
| WO | WO 2010/129118 A1 | 11/2010 |

OTHER PUBLICATIONS

Nov. 1, 2016 Office Action issued in Japanese Patent Application No. 2014-058318.
Oct. 31, 2017 Office Action issued in Japanese Patent Application No. 2014-58318.

* cited by examiner

FIG.8

| USER ID | USER ATTRIBUTE ||||  |
|---|---|---|---|---|---|
|  | GENDER | AGE | OCCUPATION | HOBBY | . . . |
| 00001 | FEMALE | 19 | STUDENT | TRAVEL | . . . |
| 00002 | MALE | 35 | OFFICE WORKER | SPORTS | . . . |
| : | : | : | : | : | : |

FIG.9

| KIND OF ADVERTISEMENT || USER ATTRIBUTE |||||
|---|---|---|---|---|---|---|
| 1 | 2 | GENDER | AGE BRACKET | OCCUPA-TION | HOBBY | . . . |
| NEW SUV CAR ADVERTISEMENT | EXISTING SUV CAR ADVERTISEMENT | MALE | 30-39 | OFFICE WORKER | SPORTS | . . . |
| NEW LIGHT CAR ADVERTISEMENT | EXISTING LIGHT CAR ADVERTISEMENT | FEMALE | 10-19 | STUDENT | TRAVEL | . . . |
| : | : | : | : | : | : | : |

ADVERTISEMENT DISTRIBUTION SYSTEM, ADVERTISEMENT DISTRIBUTION CONTROL APPARATUS, AND ADVERTISEMENT DISTRIBUTION CONTROL METHOD

CROSS-REFERENCE TO RELATED APPLICATIONS

The present application claims priority to and incorporates by reference the entire contents of Japanese Patent Application No. 2014-058318 filed in Japan on Mar. 20, 2014.

BACKGROUND OF THE INVENTION

1. Field of the Invention

The present invention relates to an advertisement distribution system, an advertisement distribution control apparatus, an advertisement distribution control method, and an advertisement distribution control program.

2. Description of the Related Art

In recent years, it has become possible to view various contents via the Internet with the extraordinary proliferation of the Internet and the improvement of the distribution technology. Following this, advertisers also have come to actively distribute their advertisements via the Internet, targeting viewers of the contents.

For example, advertisement distribution is performed which includes advertisement information in content information such as a video and provides the advertisement information to users watching the video. Examples of a technology for setting content information such as a video as an advertising medium and including advertisement information in the content information include one for associating an advertisement insertion point included in content information with an advertisement tag included in advertisement information, and enabling a display of a predetermined piece of advertisement information upon determination of an advertisement insertion point (see, for example, Japanese Translation of PCT International Application Publication No. 2012-526321).

However, the above-mentioned known technology and the like simply display an advertisement during the viewing of content such as a video. Accordingly, the advertiser may not be able to obtain an advertising effect as high as expected. Moreover, from the viewpoint of advertising distributors, and media companies having advertising media, the development of a technology for effectively distributing advertisement information is also desired to promote increase of advertising revenue.

The present application has been made considering the above, and an object thereof is to provide an advertisement distribution system, advertisement distribution control apparatus, advertisement distribution control method, and advertisement distribution control program that can effectively distribute advertisement information.

SUMMARY OF THE INVENTION

According to the exemplary embodiment, an advertisement distribution control apparatus includes a view count determination unit and a distribution/non-distribution decision unit. The view count determination unit determines the number of views of content information being distributed. The distribution/non-distribution decision unit decides whether or not to distribute advertisement information to terminal apparatuses viewing the content information, based on the number of views determined by the view count determination unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of user information;

FIG. 9 is a diagram illustrating an example of advertisement-related information;

FIG. 16 is a hardware configuration diagram illustrating an example of a computer that realizes functions of the advertisement distribution control apparatus and the like.

DETAILED DESCRIPTION OF THE PREFERRED EMBODIMENTS

Hereinafter, embodiments of an advertisement distribution system, an advertisement distribution control apparatus, an advertisement distribution control method, and an advertisement distribution control program according to the present application are described in detail with reference to the drawings. The advertisement distribution system, the advertisement distribution control apparatus, the advertisement distribution control method, and the advertisement distribution control program according to the present application are not limited by the embodiments.

1. Outline of Advertisement Distribution System

Figure 1:
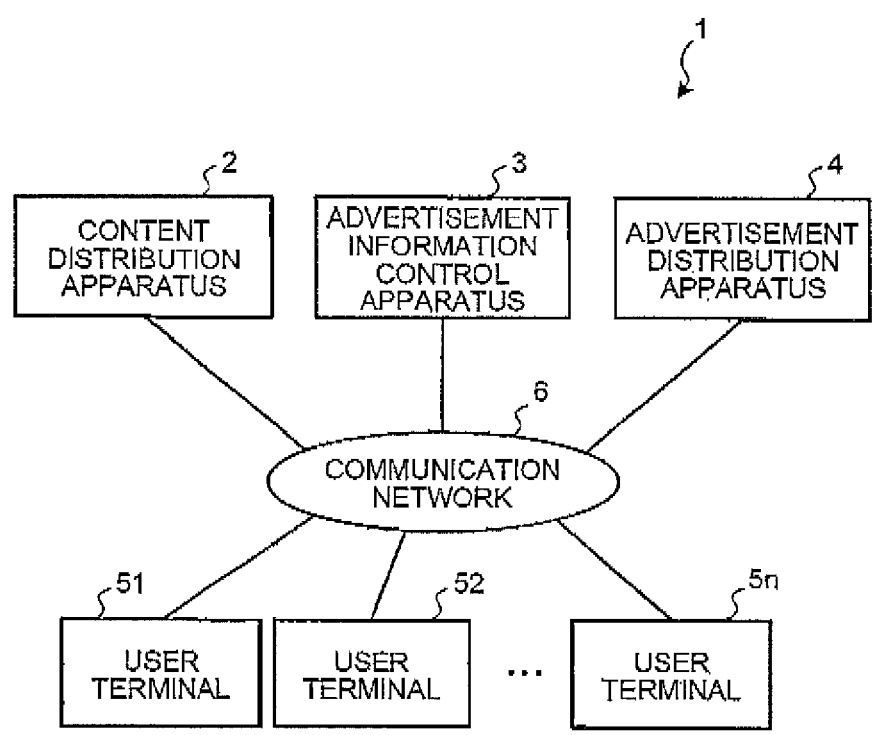
FIG. 1 is a diagram illustrating a configuration example of an advertisement distribution system according to an embodiment.
Figure 2:
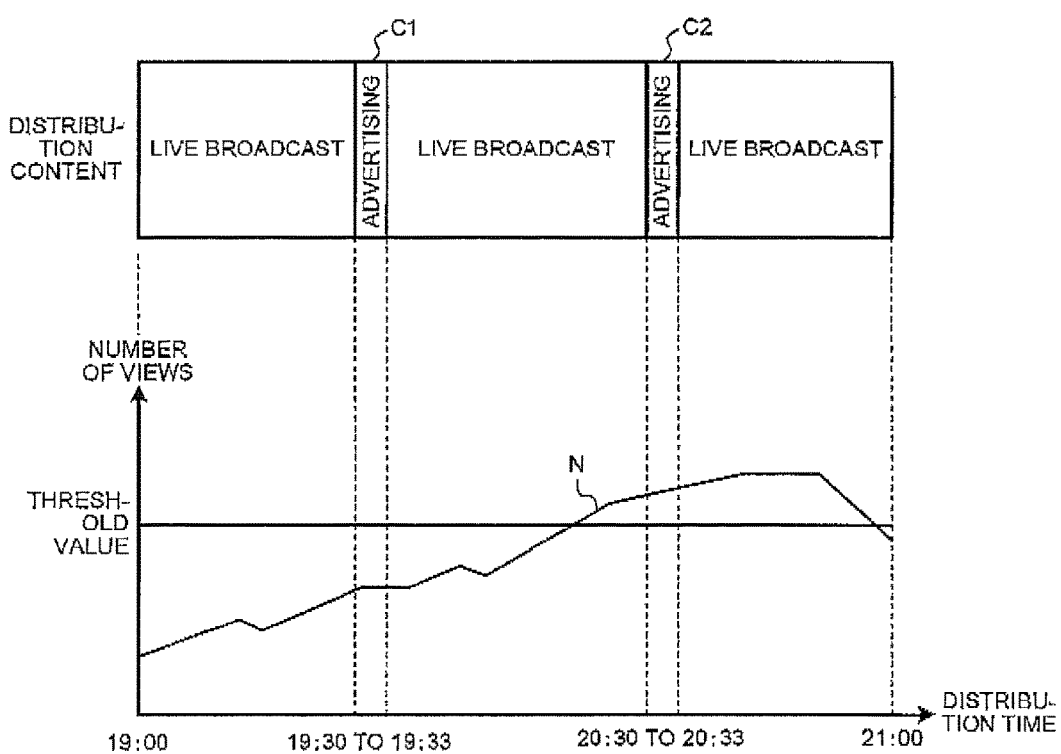
FIG. 2 is a diagram illustrating the relationship between the number of views of content information and the distribution timing of advertisement information.
Figure 3:
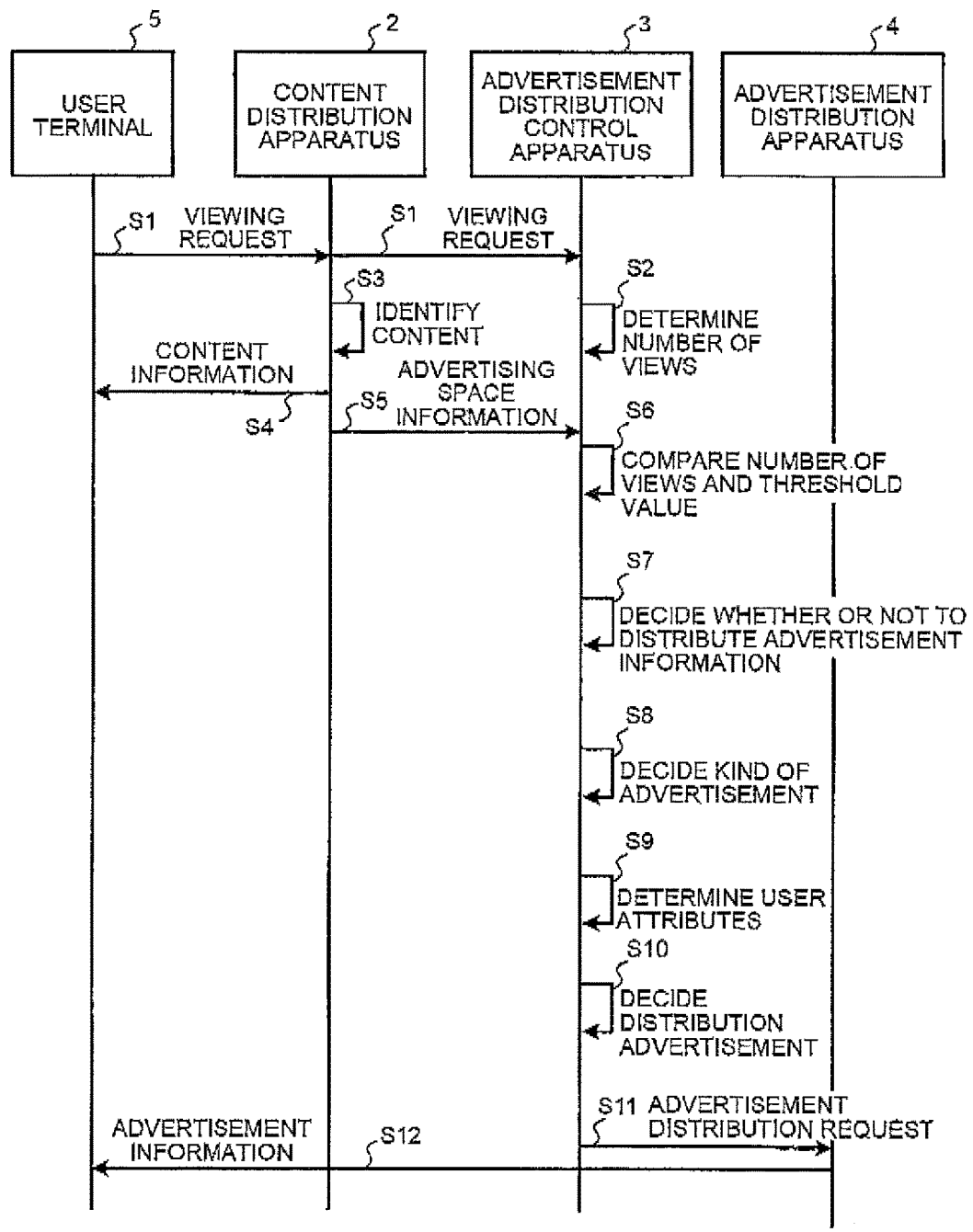
FIG. 3 is a diagram illustrating an outline of the flow of process of each apparatus in the advertisement distribution system.

Firstly, an outline of the advertisement distribution system according to an embodiment is described. FIG. 1 is a diagram illustrating a configuration example of the advertisement distribution system according to the embodiment. FIG. 2 is a diagram illustrating the relationship between the number of views of content information and the distribution timing of advertisement information. FIG. 3 is a diagram illustrating an outline of the flow of process of each apparatus in the advertisement distribution system. In the following description, a description is given taking content information of a video displayed by a video distribution application or the like (hereinafter simply referred to as the "content" in some cases) as an example of an advertising medium. However, the advertising medium may be a medium displayed by, for example, a game application, a book browser application, or an animation distribution application.

As illustrated in FIG. 1, an advertisement distribution system 1 according to the embodiment includes a content distribution apparatus 2, an advertisement distribution control apparatus 3, and an advertisement distribution apparatus 4. The apparatuses 2, 3, and 4 are connected via a communication network 6 in such a manner as to be able to communicate with each other. A plurality of user terminals 51, 52, . . . 5n is connected to the communication network 6. The communication network 6 is, for example, the Internet.

The user terminals 51, 52, . . . 5n (hereinafter collectively referred to as the "user terminal 5" in some cases) are, for example, terminal apparatuses, such as PCs (Personal Computer), PDAs (Personal Digital Assistant), and smartphones, which are used by users. A browser application (hereinafter described as the browser) is installed in the user terminals 51, 52, . . . 5n.

The content distribution apparatus 2 is, for example, a web server in which content information such as a plurality of video contents having set advertising spots is stored, and distributes a predetermined piece of content information to a plurality of user terminals 5. A control unit of the content distribution apparatus 2 provides video content designated by the user terminal apparatus 5 via the communication network 6 when a viewing request is made by, for example, a browser of the user terminal 5. Here, the content information is video content with a preset distribution start time (see FIG. 2), but a distribution start time and end time, and the like may not be preset.

The advertisement distribution system 1 according to the embodiment is configured such that the advertisement distribution control apparatus 3 also receives the viewing request of the browser of the user terminal 5. The advertisement distribution control apparatus 3 can determine the number of views by the viewing request. The advertisement distribution control apparatus 3 may be configured to receive the viewing request of the user terminal 5 via the content distribution apparatus 2.

The viewing request of the user terminal 5 includes, for example, user identification information (hereinafter described as a user ID) and an IP address of the user terminal 5. The user ID is, for example, an HTTP cookie (HyperText Transfer Protocol Cookie: hereinafter described as the cookie).

The advertisement distribution control apparatus 3 outputs, to the advertisement distribution apparatus 4, a request to distribute advertisement information set at a predetermined distribution timing, and distributes the advertisement information to the user terminal 5. At this point in time, the advertisement distribution control apparatus 3 decides whether or not to allow distribution based on the number of views of the content through the user terminal 5. In other words, the advertisement distribution control apparatus 3 decides whether or not to allow the advertisement distribution apparatus 4 to distribute advertisement information (hereinafter referred to as the advertisement content in some cases) to the user terminal 5 on the condition that the number of user views of a predetermined video content through the user terminal 5, in other words, the number of views has reached a predetermined number.

The advertisement distribution apparatus 4 distributes the advertisement information to a plurality of user terminals 5 when requested by the advertisement distribution control apparatus 3 to distribute the advertisement information. The advertisement distribution apparatus 4 can distribute the advertisement information with a distribution condition based, for example, on the number of views, to the user terminals 5 viewing the content information being distributed. The distribution condition is assumed here to exceed a specified number of views.

As described above, for example, if an advertising distributor, which may be a media company that can distribute advertisements, has made an advertisement distribution contract with an advertiser on the condition that an advertisement is distributed when the number of views reaches one hundred thousand accesses, the advertisement distribution system 1 according the embodiment can distribute the conditional advertisement in compliance with the condition.

As illustrated in FIG. 2, for example, video content such as a movie whose distribution start time is 19:00 is distributed. The video content is assumed to be provided in advance with a plurality of advertising spots C1 and C2. As illustrated, the number of views N in this case fluctuates during the distribution period of the video content. A threshold value illustrated in the figure is the number of views (for example, one hundred thousand accesses) being the advertisement distribution condition by the advertiser.

When the distribution of the video content starts, and the first advertising spot C1 comes, the number of views N has not reached the threshold value. Hence, the conditional advertisement is not distributed in the first advertising spot C1. In this case, another piece of advertisement information is distributed which is, for example, a general advertisement for which the advertisement distribution condition based on the number of views N is not set.

After the other piece of advertisement information is distributed in the first advertising spot C1, the distribution of the video content continues. If the number of views N exceeds the threshold value at some point in time, and the second advertising spot C2 comes immediately afterwards, the advertisement distribution condition is satisfied; therefore, the conditional advertisement is distributed in the second advertising spot C2.

In the example illustrated in FIG. 2, the video content is temporarily stopped, and advertisement content is displayed on a display of the user terminal 5 in each advertising spot. However, the advertisement content may be displayed, for example, in an advertising display area provided in a part of a display area of the video content, or an advertising display area provided outside the display area of the video content. Moreover, the video content may not be a movie but may be content to be distributed in real time, whose distribution start time is decided, such as a live sports broadcast or live concert broadcast.

A brief description is given of the flows of process of the apparatuses 2, 3, and 4 of the advertisement distribution system 1 in the embodiment with reference to FIG. 3. As illustrated, a viewing request of the user terminal 5 is accepted by the content distribution apparatus 2 and the advertisement distribution control apparatus 3 (step S1). The viewing request of the user terminal 5 accepted by the advertisement distribution control apparatus 3 may be received via the content distribution apparatus 2.

The advertisement distribution control apparatus 3 counts the viewing requests and determines the number of views N (step S2). On the other hand, after accepting the viewing request, the content distribution apparatus 2 identifies content requested by the user terminal 5 (step S3), and distributes the content in line with the user request to the user terminal 5 (step S4). Moreover, the content distribution apparatus 2 outputs information on an advertising spot set in the content distributed to the user terminal 5, as advertising space information, to the advertisement distribution control apparatus 3 (step S5).

The advertisement distribution control apparatus 3, which has obtained the advertising space information from the content distribution apparatus 2, regularly detects the number of views of the content information, and compares the number of views N with the threshold value (for example, one hundred thousand accesses) to determine whether or not to satisfy the advertisement distribution condition (step S6). The advertisement distribution control apparatus 3 decides whether or not to distribute advertisement information based on the comparison result (step S7). Specifically, whether or not to distribute the conditional advertisement under the distribution condition that the number of views N has reached the threshold value is decided. If the number of views N has reached the threshold value, the conditional advertisement is distributed. On the other hand, if the number of views N has not reached the threshold value, a general advertisement can be distributed instead of the conditional advertisement.

Furthermore, the advertisement distribution control apparatus 3 determines a user ID and user attributes included in the viewing request of the user terminal 5 accepted in step S1 (step S10), and decides a distribution advertisement according to the determination result (step S10). In terms of the distribution advertisement that is decided here, for example, an advertisement with a higher appeal effect is selected from conditional advertisements and general advertisements, depending on the user attributes.

Next, the advertisement distribution control apparatus 3 outputs a request to distribute the decided distribution advertisement (the conditional advertisement or general advertisement) to the advertisement distribution apparatus 4 (step S11). The advertisement distribution apparatus 4, which has received the distribution request, distributes a predetermined piece of advertisement information to the user terminal 5 (step S12). Consequently, the advertisement information can be distributed more effectively, and the improvement of the appeal effect can be expected. If the content such as a video is interrupted and an advertisement is distributed, although the illustration is omitted, the advertisement distribution control apparatus 3 outputs a content pause request to the content distribution apparatus 2 when requesting the advertisement distribution apparatus 4 to distribute an advertisement. When the distribution of the advertisement information ends, the advertisement distribution control apparatus 3 outputs a request to distribute the content to the content distribution apparatus 2, and resumes the content.

In step S7, for example the advertisement information decided to be distributed is served in the second advertising spot C2 in the example illustrated in FIG. 2. In other words, the advertisement distribution control apparatus 3 decides whether the distribution timing (the first advertising spot C1 or the second advertising spot C2) of the advertisement information determined depending on the content information is right or wrong. In the above-mentioned brief description using FIG. 3, when a distribution advertisement is decided, a decision is made based on the user attributes. However, the user attributes are not necessarily required to be used.

Moreover, if the video content is a live broadcast such as sports, it is possible to make forecasts to a certain degree for one having a fixed game time such as soccer. Accordingly, an advertising spot can be set. However, for example, in a case of a baseball broadcast, it is difficult to previously set an advertising spot in the video content. In such a case, an advertisement distribution request may be output at an appropriate timing such as a timing when the game is stopped or a timing between innings. In that case, it is also possible to compare the threshold value and the number of views N and decide whether or not to allow distribution when outputting the advertisement distribution request.

Moreover, if an advertising spot is not previously set in the video content, the advertisement distribution request may be output at a distribution timing when the number of views N has reached the threshold value or has exceeded the threshold value. In other words, the distribution timing of the conditional advertisement may be decided in the advertisement distribution control apparatus 3. In this case, the advertisement content being the conditional advertisement can be displayed in a specific advertising display area partitioned in the display area of the video content, or an advertising display area provided outside the display area of the video content in order not to inhibit the viewing of the video content.

Hereinafter, a description is given of the content distribution apparatus 2, the advertisement distribution control apparatus 3, and the advertisement distribution apparatus 4, which are included in the advertisement distribution system 1.

2. Content Distribution Apparatus 2

Figure 4:
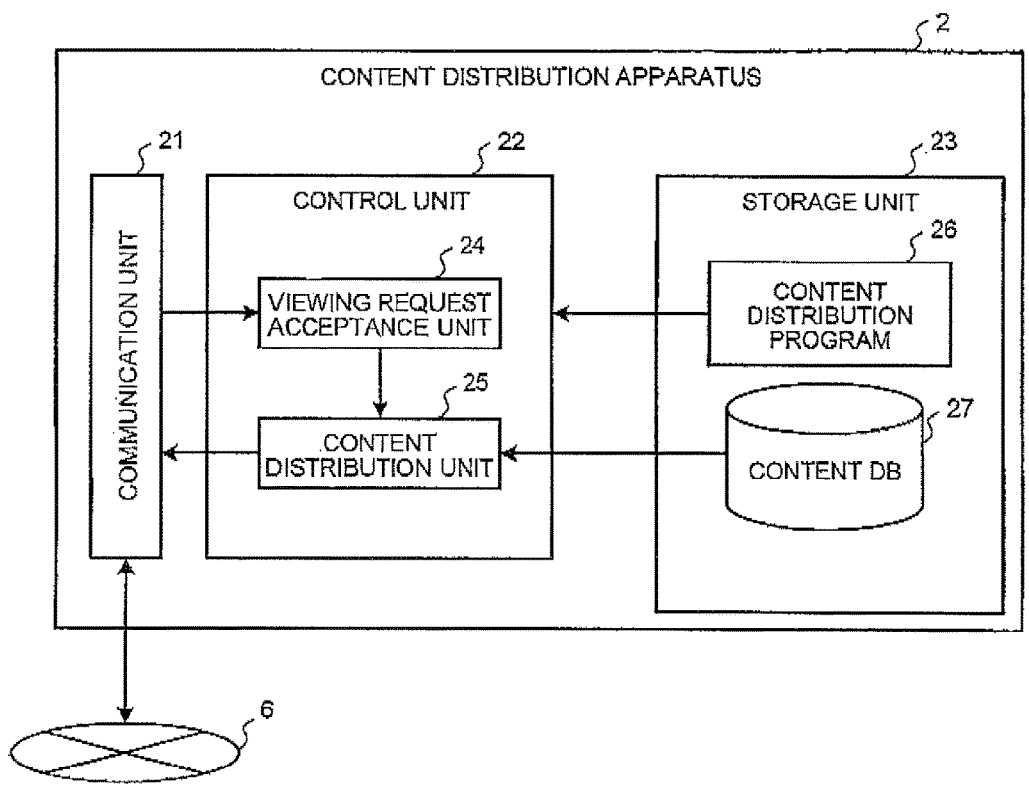
FIG. 4 is a block diagram of a content distribution apparatus according to the embodiment.
Figure 5:
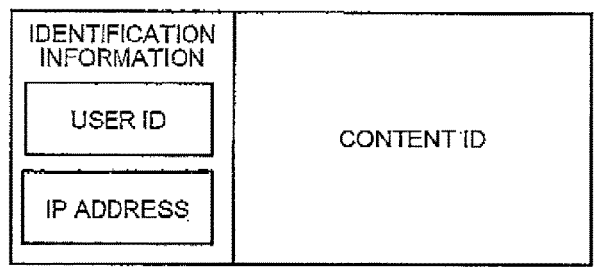
FIG. 5 is a diagram illustrating an example of information included in a viewing request.
Figure 6:
FIG. 6 is a diagram illustrating an example of the internal configuration of the content information.

Firstly, the content distribution apparatus 2 is described. FIG. 4 is a block diagram of the content distribution apparatus 2. FIG. 5 is a diagram illustrating information included in a viewing request of the user terminal 5. FIG. 6 is a diagram illustrating an example of the internal configuration of the content information.

As illustrated in FIG. 4, the content distribution apparatus 2 includes a communication unit 21, a control unit 22, and a storage unit 23.

The communication unit 21 is a communication interface that transmits and receives information to and from the communication network 6. The control unit 22 can transmit and receive various pieces of information to and from the advertisement distribution control apparatus 3, the advertisement distribution apparatus 4, and the user terminal 5 via the communication unit 21 and the communication network 6. For example, the communication unit 21 receives a content viewing request including a user ID from the user terminal 5, and transmits content information in line with the user's request, to the user terminal 5.

The storage unit 23 is a device that stores various pieces of information. Examples of the storage unit 23 include semiconductor memory devices such as a RAM (Random Access Memory) and a flash memory, and storage devices such as a hard disk and an optical disc. An OS (Operating System) to be executed by the control unit 22 and various programs such as a content distribution program 26 are stored in the storage unit 23. The storage unit 23 includes a content DB 27.

The control unit 22 is a device that controls the content distribution apparatus 2, and performs a distribution control process of content information. The control unit 22 is realized by an integrated circuit such as an ASIC. Application Specific Integrated Circuit) or FPGA (Field Programmable Gate Array). An internal CPU (Central Processing Unit) or MPU (Micro Processing Unit) executes the content distribution program 26 using the RAM as a work area, and accordingly the control unit 22 functions as a viewing request acceptance unit 24 and a content distribution unit 25.

The viewing request acceptance unit 24 accepts a viewing request of the user terminal 5, and acquires information illustrated in FIG. 5. As illustrated in FIG. 5, the viewing request of the user terminal 5 includes a content ID, user ID, IP address, and the like.

The content distribution unit 25 acquires the requested content information from the content DB 27 based on the information obtained by the viewing request acceptance unit 24, and distributes the content information to the user terminal 5 requesting for viewing. Video content information and advertising, space information associated by a time axis and previously set as the content information distributed here as illustrated in FIG. 6. The video content information illustrated in FIG. 6 corresponds to the video of the distribution content illustrated in FIG. 2. The advertising space information illustrated in FIG. 6 corresponds to the advertising spots C1 and C2 illustrated in FIG. 2.

3. Advertisement Distribution Control Apparatus 3

Figure 7:
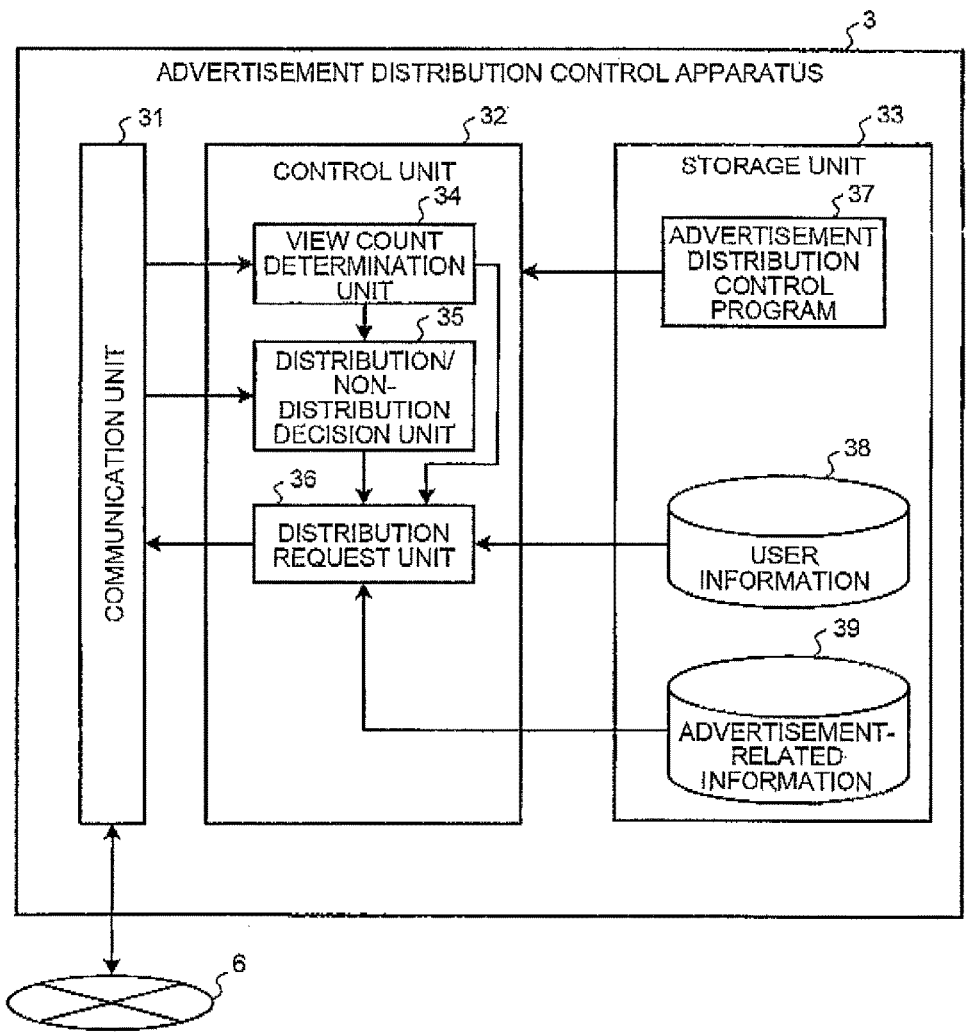
FIG. 7 is a block diagram of an advertisement distribution control apparatus according to the embodiment.

The advertisement distribution control apparatus 3 according to the embodiment is described. FIG. 7 is a block diagram illustrating the advertisement distribution control apparatus 3 according to the embodiment. FIG. 8 is a diagram illustrating an example of user information. FIG. 9 is a diagram illustrating an example of advertisement information.

As illustrated in FIG. 7, the advertisement distribution control apparatus 3 includes a communication unit 31, a control unit 32, and a storage unit 33.

The communication unit 31 is a communication interface that transmits and receives information to and from the communication network 6. The control unit 32 can transmit and receive various pieces of information to and from the content distribution apparatus 2, the advertisement distribution apparatus 4, and the user terminal 5 via the communication unit 31 and the communication network 6. For example, the communication unit 31 receives a content viewing request including a user ID from the user terminal 5, receives content information including advertising space information from the content distribution apparatus 2, and transmits an advertisement distribution request to the advertisement distribution apparatus 4.

The storage unit 33 is a device in which various pieces of information are stored. Examples of the storage unit 33 include semiconductor memory devices such as a RAM and a flash memory, and storage devices such as a hard disk and an optical disc. In addition to an OS to be executed by the control unit 32 and various programs such as an advertisement distribution control program 37, user information 38 and advertisement-related information 39 are stored in the storage unit 33.

The user information 38 is a table in which information on users is stored. As illustrated in FIG. 8, the user information 38 includes items such as user ID and user attribute, and a user is associated with user attributes. The item of the user attribute includes the user's gender, age, occupation, and hobby.

In the example illustrated in FIG. 8, the user attributes of a user ID "00001" indicate the gender "female," age "19", occupation "student," and hobby "travel." Moreover, the user attributes of a user ID "00002" indicate the gender "male," age "35", occupation "office worker", and hobby "sports."

The advertisement-related information 39 is a table in which information on advertisement information is stored. As illustrated in FIG. 9, the advertisement-related information 39 includes items of the kind of advertisement and user attribute, and the kind of advertisement is associated with user attributes. The example illustrated in FIG. 9 is a case where an advertiser is an automotive company.

The item of the kind of advertisement is classified as "1" or "2". "1" indicates the conditional advertisement for which the advertisement distribution condition based on the number of views N is set. "2" indicates the general advertisement for which the advertisement distribution condition based on the number of views N is not set. The item of the user attribute includes gender, age bracket, occupation, and hobby. The use of the table enables the distribution of advertisement information that is judged to match a user's profile.

In the example illustrated in FIG. 9, if the kind of advertisement is "1 (the conditional advertisement)," an advertisement specified as a "new SUV car advertisement" is associated as an advertisement, for users matching the user attributes of gender "male," age bracket "30-39," occupation "office worker," and hobby. "sports." On the other hand, if the kind of advertisement is "2 (the general advertisement)," an advertisement specified as an "existing SUV car advertisement" is associated. Moreover, as an advertisement for users matching the user attributes of gender "female," age bracket "10-19," occupation "student," and hobby "travel," an advertisement specified as a "new light car advertisement" is associated if the kind of advertisement is "1", and an advertisement specified as an "existing light car advertisement" is associated if the kind of advertisement is "2". The "new SUV car advertisement," the "existing SUV car advertisement," the "new light car advertisement," the "existing light car advertisement", and the like function as advertisement IDs.

The control unit 32 is a device that controls the advertisement distribution control apparatus 3, and performs an advertisement distribution control process. The control unit 32 is realized by an integrated circuit such as an ASIC or an FPGA. An internal CPU or MPU executes the advertisement distribution control program 37 using the RAM as a work area, and accordingly the control unit 32 functions as a view count determination unit 34, a distribution/non-distribution decision unit 35, and a distribution request unit 36.

The view count determination unit 34 receives a viewing request of the user terminal 5, counts the viewing requests, and determines the number of views N. The view count determination unit 34 sequentially outputs the determination result (the number of views N) to the distribution/non-distribution decision unit 35 and the distribution request unit 36. The received viewing request includes the information illustrated in FIG. 5. Accordingly, the view count determination unit 34 can determine the user attributes from the user ID included in the viewing request. Therefore, the view count determination unit 34 can count the number of views N for, for example, each gender being the user attribute.

The distribution/non-distribution decision unit 35 receives advertising space information from the content distribution apparatus 2, and sequentially-receives the number of views N being the determination result from the view count determination unit 34. Whether or not to distribute the conditional advertisement is decided based on the timing of an advertising spot included in content information obtained from the advertising space information, and the number of views N obtained from the view count determination unit 34. In other words, a decision is made on whether or not to distribute the conditional advertisement in an advertising spot coming soon. The kind of advertisement of advertisement content is decided based on the decision to output a decision signal to the distribution request unit 36. In other words, if the comparison result of the number of views N and the threshold value immediately before the advertising spot satisfies, for example, the view count condition, a signal indicating "1 (the conditional advertisement)" of the kind of advertisement is output as a decision signal. If the comparison result does not satisfy the viewing condition, a signal indicating "2 (the general advertisement)" as the kind of advertisement is output as a decision signal.

Moreover, the distribution/non-distribution decision unit 35 can also decide a content distribution timing for the distribution request unit 36 to cause the content distribution apparatus 2 to make a distribution request such that, for example, a viewer can watch the remaining part of the content at the timing when the distribution of the advertisement ends.

The distribution request unit 36 outputs, to the content distribution apparatus 2 and the advertisement distribution apparatus 4, a distribution request to cause the video content and advertisement information of a kind decided by the distribution/non-distribution decision unit 35 to be distributed to the user terminal 5. Moreover, the distribution request unit 36 sequentially inputs the number of views N from the view count determination unit 34. When a signal from the distribution/non-distribution decision unit 35 is input, the distribution request unit 36 determines from the signal whether the kind of advertisement is "1" or "2". If a signal indicating "1" as the kind of advertisement is received, an advertisement ID to be distributed is decided based on the user information 38 and the advertisement-related information 39, which are stored in the storage unit 33. On the other hand, if a signal indicating "1" as the kind of advertisement is received, an advertisement ID to be distributed is decided based on the user information 38 and the advertisement-related information 39, which are stored in the storage unit 33. The distribution request unit 36 then outputs a distribution request including the decided advertising ID to the advertisement distribution apparatus 4.

4. Advertisement Distribution Apparatus 4

Figure 10:
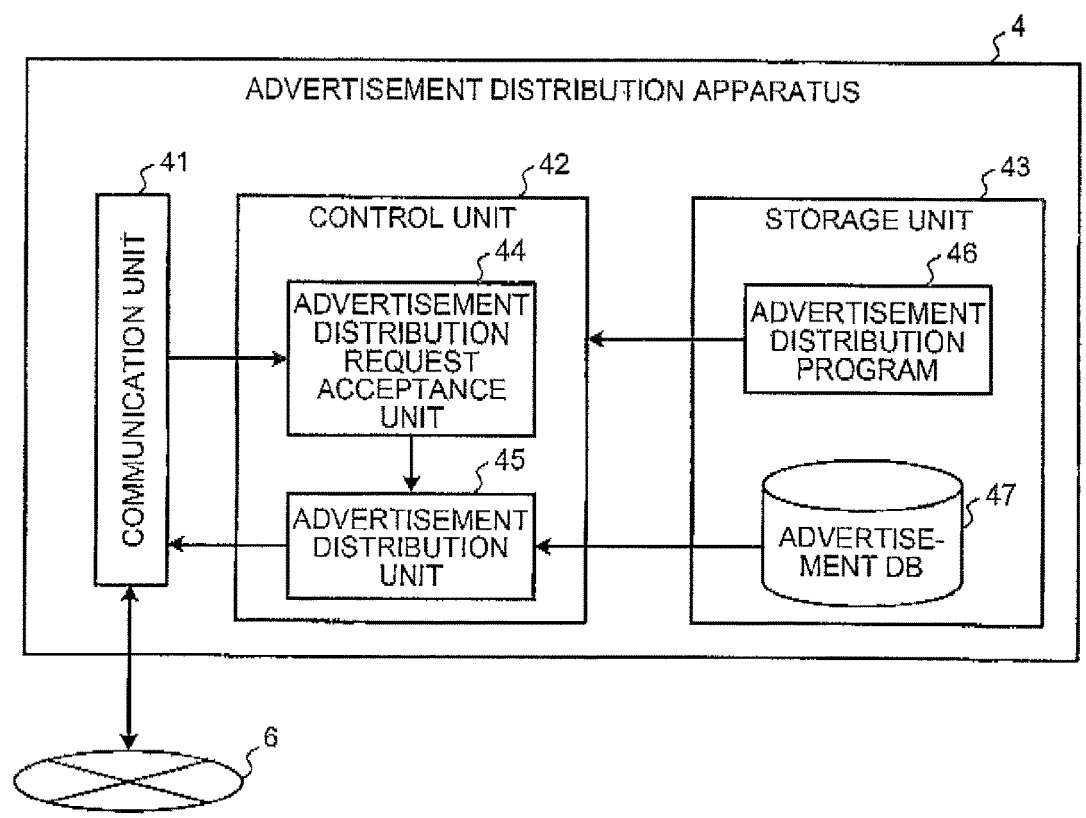
FIG. 10 is a block diagram of an advertisement distribution apparatus according to the embodiment.

FIG. 10 is a block diagram of the advertisement distribution apparatus 4. As illustrated in FIG. 10, the advertisement distribution apparatus 4 includes a communication unit 41, a control unit 42, and a storage unit 43.

The communication unit 41 is a communication interface that transmits and receives information to and from the communication network 6. The control unit 42 can transmit and receive various pieces of information to and from the advertisement distribution control apparatus 3 and the user terminal 5 via the communication unit 41 and the communication network 6. For example, the communication unit 41 receives an advertisement distribution request from the advertisement distribution control apparatus 3, and transmits, to the user terminal 5, advertisement information in accordance with the distribution request of the advertisement distribution control apparatus 3.

The storage unit 43 is a device in which various pieces of information are stored. Examples of the storage unit 43 include semiconductor memory devices such as a RAM and a flash memory, and storage devices such as a hard disk and an optical disc. An OS to be executed by the control unit 42 and various programs such as an advertisement distribution program 46 are stored in the storage unit 43. The storage unit 43 includes an advertisement DB 47.

The advertisement DB 47 includes a wide variety of advertisement contents under a contract with an advertiser. An advertisement ID is added to each advertisement content. For example, the advertisement DB 47 includes advertisement information (advertisement content) corresponding to advertisement IDs, such as the "new SUV car advertisement," the "existing SUV car advertisement," the "new light car advertisement," and the "existing light car advertisement," stored in the table of the advertisement-related information 39 included in the storage unit 33 of the advertisement distribution control apparatus 3.

Therefore, the advertisement distribution apparatus 4 can retrieve, from the advertisement DB 47, the advertisement content corresponding to an advertisement ID included in a distribution request of the advertisement distribution control apparatus 3, and distribute the advertisement content to the user terminal 5.

The control unit 42 is a device that controls the advertisement distribution apparatus 4, and performs an advertisement distribution process. The control unit 42 is realized by an integrated circuit such as an ASIC or an FPGA. An internal CPU or MPU executes the advertisement distribution program 46 using the RAM as a work area, and accordingly the control unit 42 functions as an advertisement distribution request acceptance unit 44 and an advertisement distribution unit 45.

The advertisement distribution request acceptance unit 44 accepts an advertisement distribution-request of the advertisement distribution control apparatus 3. Moreover, the advertisement distribution unit 45 acquires, from the advertisement DB, an advertisement in accordance with the advertisement distribution request accepted by the advertisement distribution request acceptance unit 44, and distributes the advertisement.

In this manner, for example, if an advertisement distribution contract is made with an advertiser on the condition that an advertisement is distributed when the number of views N reaches a predetermined number, the advertisement distribution system 1 according the embodiment can have multiple users view the advertisement under the condition. Hence, the improvement of the appeal effect of advertising can be expected.

5. Process Flow of Advertisement Distribution System 1

A description is given of the processing procedures in the apparatuses 2, 3, and 4 of the advertisement distribution system 1 according to the embodiment. In the following, a description is given of the content distribution process by the content distribution apparatus 2 with reference to FIG. 11, the advertisement distribution control process of the advertisement distribution control apparatus 3 with reference to FIG. 12, and the advertisement distribution process of the advertisement distribution apparatus 4 with reference to FIG. 13.

(Content Distribution Process of Content Distribution Apparatus 2)

Figure 11:
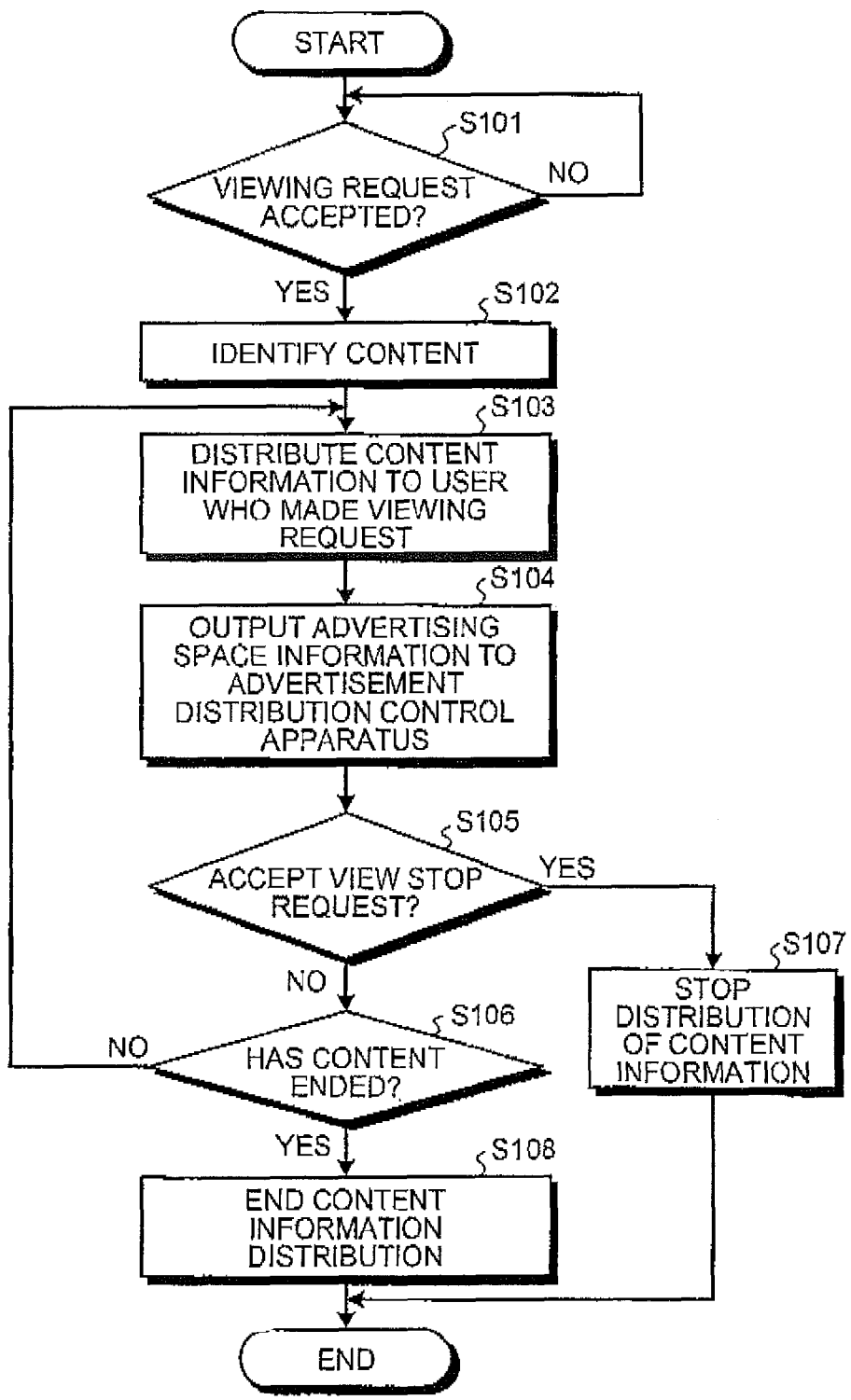
FIG. 11 is a flowchart illustrating an example of the process of the content distribution apparatus according to the embodiment.

FIG. 11 is a flowchart illustrating an example of the process of the content distribution apparatus 2 according to the embodiment. The operation is repeatedly executed by the control unit 22 of the content distribution apparatus 2. As illustrated in FIG. 11, the control unit 22 of the content distribution apparatus 2 waits until accepting a viewing request of the user terminal 5. When accepting a viewing request (step S101: Yes), the control unit 22 identifies requested content from a content ID included in the viewing request (step S102).

Next, the control unit 22 distributes the identified content to the user terminal 5 that has made the viewing request (step S103). Moreover, the control unit 22 outputs, to the advertisement distribution control apparatus 3, advertising space information set in the content information distributed to the user terminal 5 (step S104). Since the advertising space information can be obtained from the content ID included in the viewing request, either of the processes of steps S103 and S104 can precede the other.

The control unit 22 continues distributing the video content until accepting a view stop request from the user terminal 5 (step S105: No). When accepting a view stop request from the user terminal 5 (step S105: Yes), the control unit 22 shifts the processing to step S107, stops the distribution of the video content, and ends the content distribution process. The view stop request of the user terminal 5 occurs due to things such as the operation of a stop button on the user terminal 5.

Moreover, the control unit 22 determines whether or not an end time of the video content being distributed has come (step S106). If determining that it is not the end time, the control unit 22 continues the distribution of the video content (step S106: No). On the other hand, if determining that it is the end time (step S106: Yes), the control unit 22 ends the distribution of the video content (step S108), and ends the content distribution process.

(Advertisement Distribution Control Process of Advertisement Distribution Control Apparatus 3)

Figure 12:
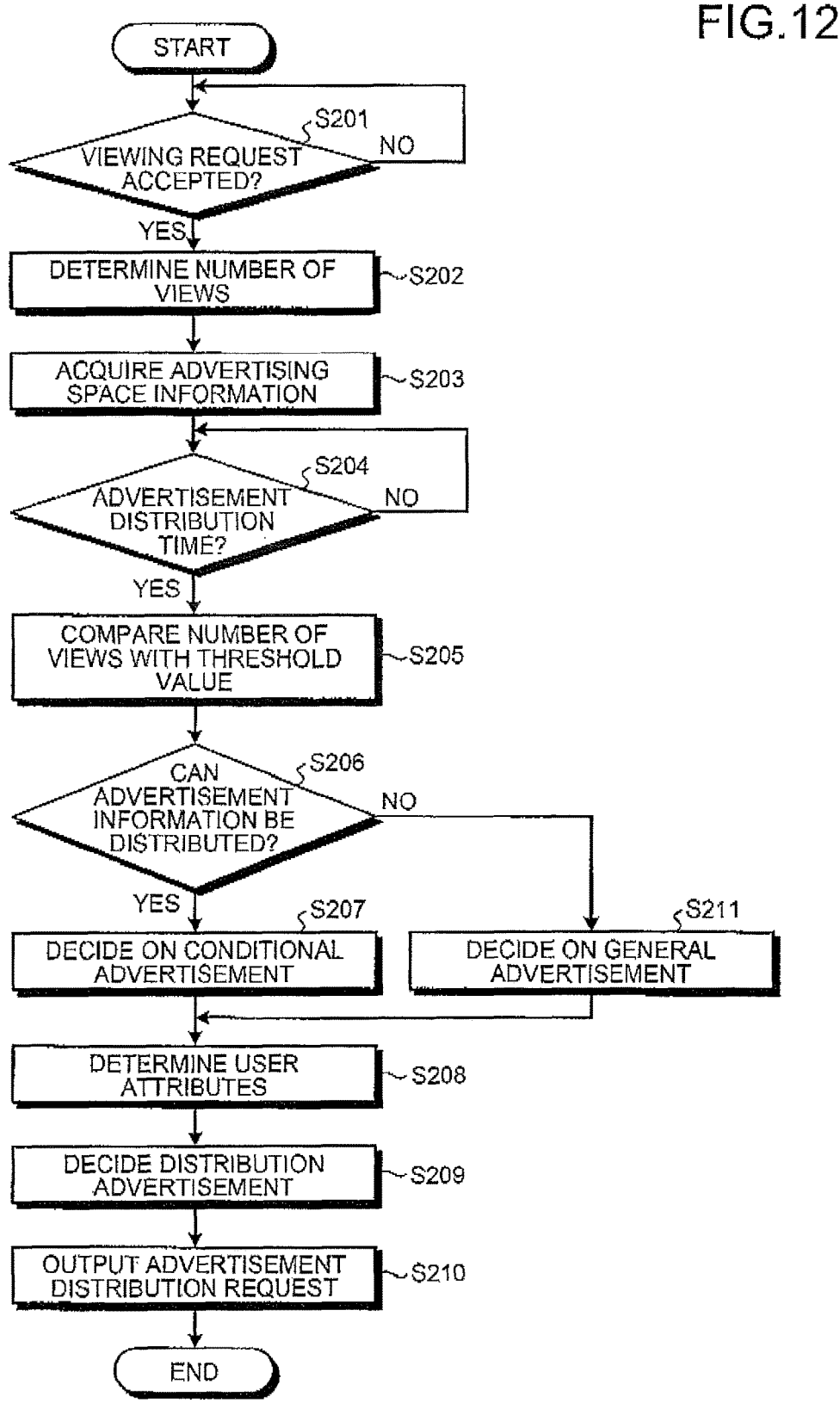
FIG. 12 is a flowchart illustrating an example of the process of the advertisement distribution control apparatus according to the embodiment.

FIG. 12 is a flowchart illustrating an example of the process of the advertisement distribution control apparatus 3 according to the embodiment. The operation is repeatedly executed by the control unit 32 of the advertisement distribution control apparatus 3. As illustrated in FIG. 12, the control unit 32 of the advertisement distribution control apparatus 3 waits until accepting a viewing request of the user terminal 5. When accepting a viewing request (step S201: Yes), the control unit 32 counts the viewing requests, and determines the number of views N of the video content being distributed from the content distribution apparatus 2 as of this point in time (step S202).

Moreover, the control unit 32 acquires advertising space information transmitted from the content distribution apparatus 2 (step S203), recognizes a set time of an advertising spot set in the video content being distributed by the content distribution apparatus 2, and waits until the advertisement distribution time (step S204: No). If determining that the advertisement distribution time has come. step S204: Yes), the control unit 32 compares the number of views N with a threshold value being its advertisement distribution condition (step S205).

Next, the control unit 32 decides whether or not to distribute advertisement information based on the result of step S205 (step S206). In other words, the control unit 32 determines whether or not the condition of the number of views (the number of views N has reached or exceeded the threshold value) is satisfied at this point in time. If the condition is satisfied (step S206: Yes), the control unit 32 decides to distribute a conditional advertisement (step S207).

Next, the control unit 32 determines user attributes (step S208), and decides an advertisement ID to be distributed based on the user information 38 and the advertisement-related information 39, which are stored in the storage unit 33 (step S209). The control unit 32 then outputs an advertisement distribution request including the decided advertisement ID to the advertisement distribution apparatus 4 (step S210), and ends the advertisement distribution control process.

On the other hand, if the condition is not satisfied in step S206 (step S206; No), the control unit 32 decides to distribute a general advertisement (step S211), and shifts the processing to step S208. Next, the control unit 32 decides an advertisement ID to be distributed among general advertisements (step S209), and outputs an advertisement distribution request including the decided advertisement ID to the advertisement distribution apparatus 4 (step S210)

(Advertisement Distribution Process of Advertisement Distribution Apparatus 4)

Figure 13:
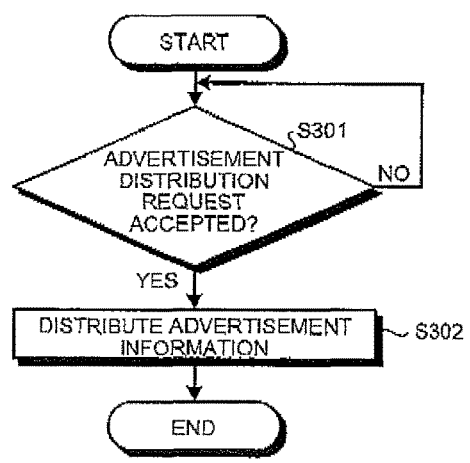
FIG. 13 is a flowchart illustrating an example of the process of the advertisement distribution apparatus according to the embodiment.

FIG. 13 is a flowchart illustrating an example of the process of the advertisement distribution apparatus 4 according to the embodiment. The operation is repeatedly executed by the control unit 42 of the advertisement distribution apparatus 4. As illustrated in FIG. 13, the control unit 42 of the advertisement distribution apparatus 4 waits until an advertisement distribution request of the advertisement distribution control apparatus 3 is input (step S301: No). When accepting an advertisement distribution request (step S301: Yes), the control unit 42 retrieves advertisement content in accordance with an advertisement ID included in the advertisement distribution request from the advertisement DB 47 of the storage unit 43, and distributes the advertisement content to the user terminal 5 (step S302), and ends the advertisement distribution process.

6. Other Embodiments

In the above-mentioned embodiment, the number of views N is detected and determined at predetermined time intervals during the video content distribution period. However, the number of views N may be determined with a predicted value. For example, it can be seen from FIG. 2 that the number of views N of the video content that starts being distributed at 19:00 has a tendency to increase over time although having slight fluctuations. Hence, in the advertisement distribution control apparatus 3, the distribution/non-distribution decision unit 35, which has acquired information on the number of views N from the view count determination unit 34, can predict the number of views N as of the second advertising spot C2, at a point in time before the second advertising spot C2 set at 20:30. In other words, it becomes possible to predict from the increasing, tendency of the number of views N that the number of views N exceeds the threshold value as of the second advertising spot C2 and judge that the second advertising spot C2 is a timing of distributing a conditional advertisement.

Moreover, in the above-mentioned embodiment, the advertisement distribution control apparatus 3 is configured to decide whether or not to distribute advertisement information to be distributed to the user terminals 5, based on the number of views N determined by the view count determination unit 34. In other words, basically, the advertisement distribution timing is decided first, and whether or not to distribute an advertisement at that timing is then decided. However, the advertisement distribution control apparatus 3 can also be configured including a timing decision unit, and decide a distribution timing of advertisement information to be distributed to the user terminals 5 based on the number of views N determined by the view count determination unit

34. In this case, the distribution request unit 36 can output a request to distribute advertisement information in tune with the distribution timing decided by the distribution timing decision unit.

For example, view count divisions such as a first view count division to an n-th view count division are set in advance according to the magnitude of the number of views N, and a plurality of advertisements is prepared in advance in association with the view count division. The timing decision unit then determines the number of views, selects an advertisement associated with the view count division according to the number of views indicated by the determination result as appropriate, and distributes the advertisement. Also in this case, advertisement information to be distributed can be associated with the attributes of a user using the user terminal 5 viewing content information.

Figure 14:
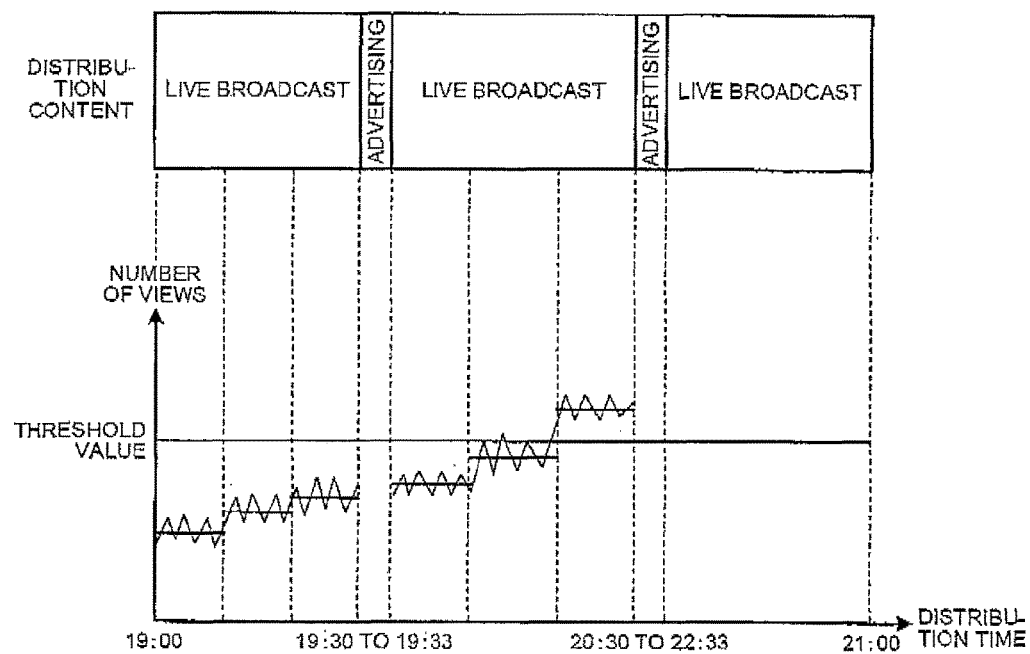
FIG. 14 is a diagram illustrating an example of a method for determining the number of views of content information.

Moreover, the number of views N may be determined with a temporal average value. FIG. 14 is a diagram illustrating an example of a method for determining the number of views N of content information. As illustrated, the entire distribution period of video content is divided into a plurality of unit periods. The average number of views in each divided unit period is assumed to be the number of views N used to decide the distribution timing of advertisement information. Therefore, the distribution/non-distribution decision unit 35 of the advertisement distribution control apparatus 3 decides whether or not to distribute the advertisement information using the average number of views. The use of the number of views N with the average value enables the provision of an advertisement to actual viewers from which zapping and the like are excluded.

Moreover, in the above-mentioned embodiment, the advertisement distribution control apparatus 3 is configured to count the number of views N when accepting a viewing request. However, it can be configured such that the number of user terminals 5 whose continuous viewing time of content information being distributed is equal to or more than a predetermined time among the user terminals 5 viewing the content information is set to be the number of views N. The use of the number of views N determined under the condition enables advertisement distribution based on the actual number of views N from which zapping and the like are excluded, also in this case.

Moreover, in the above-mentioned embodiment, the distribution request unit 36 of the advertisement distribution control apparatus 3 is configured to distribute, to the user terminal 5, the number of views N and advertisement information associated with the user attributes of a user using the user terminal 5 viewing content information. In other words, as illustrated in FIG. 9, advertisement IDs vary depending on the user attributes, and the user attributes are used to select an advertisement to be distributed.

However, the user attributes can also be used to decide an advertisement distribution timing. In other words, the distribution/non-distribution decision unit 35 of the advertisement distribution control apparatus 3 can also decide whether or not to distribute advertisement information based on the number of views N according to each user attribute of a user using the user terminal 5 viewing content information. In this case, it is also possible to handle a condition that the number of views N of male users is equal to or more than a predetermined number, or the number of views N of student users whose hobby is travel is equal to or more than a predetermined number, as an advertisement distribution condition of an advertisement distribution contract made with an advertiser. Accordingly, it becomes possible to make an advantageous advertisement distribution contract.

Figure 15:
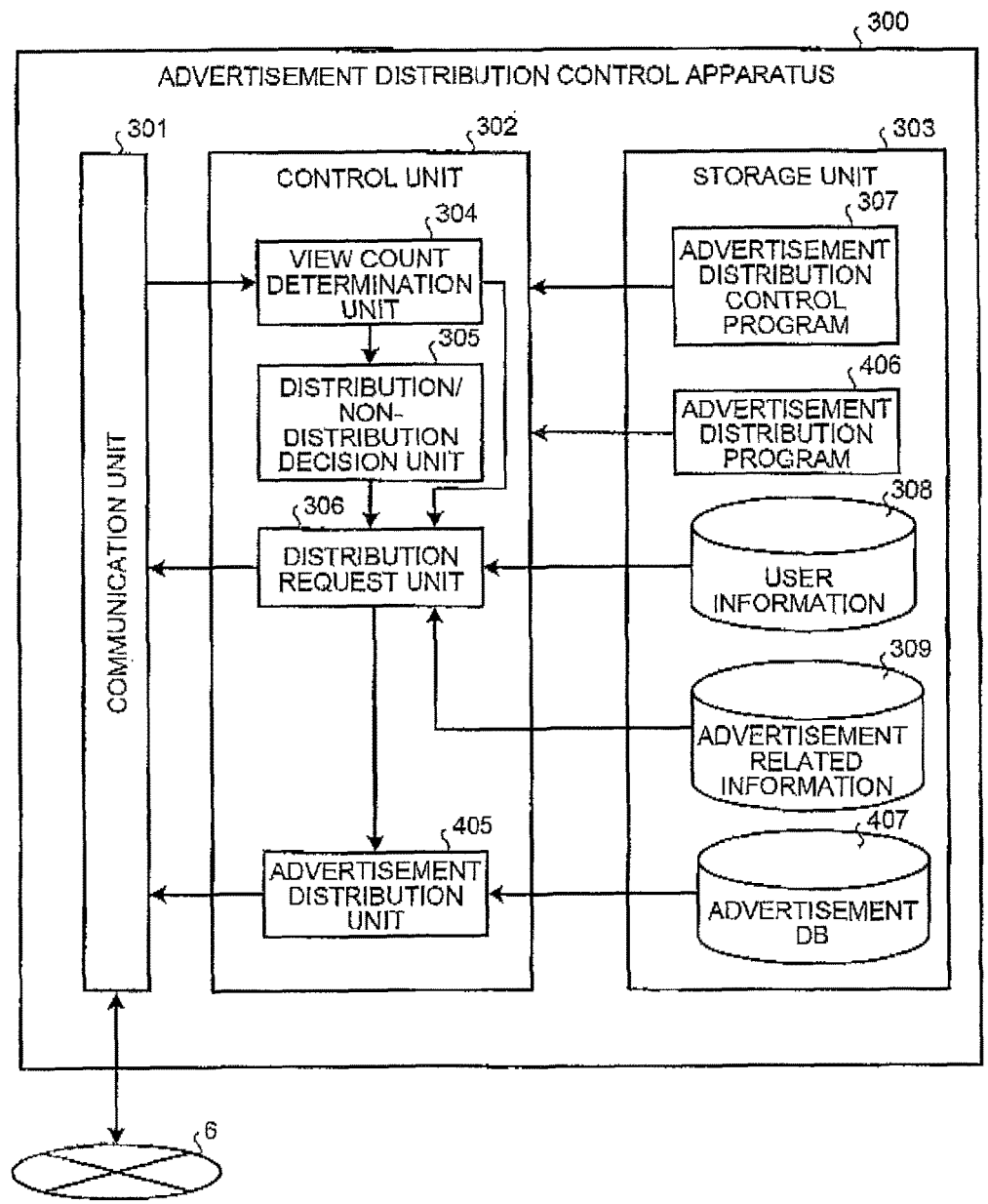
FIG. 15 is a block diagram illustrating an example of an advertisement distribution control apparatus according to another embodiment.

Moreover, in the above-mentioned embodiment, the content distribution apparatus 2 is a standalone web server. However, the advertisement distribution control apparatus 3 may be configured to have an advertisement distribution function. FIG. 15 is a block diagram illustrating an example of an advertisement distribution control apparatus according to another embodiment. As illustrated, an advertisement distribution control apparatus 300 according to the other embodiment includes a communication unit 301, a control unit 302, and a storage unit 303.

The storage unit 303 includes an advertisement distribution control program 307, user information 308, and advertisement-related information 309, which are respectively equivalent to the advertisement distribution control program 37, the user information 38, and the advertisement-related information 39, which are contained in the storage unit 33 of the advertisement distribution control apparatus 3 illustrated in FIG. 7. In addition, the storage unit 303 includes an advertisement distribution program 406 and an advertisement DB 407, which are equivalent to the advertisement distribution program 46 and the advertisement DB 47, which are contained in the storage unit 43 of the advertisement distribution apparatus 4 illustrated in FIG. 10.

Moreover, the control unit 302 of the advertisement distribution control apparatus 300 according to the other embodiment includes a view count determination unit 304, a distribution/non-distribution decision unit 305, and a distribution request unit 306, which are equivalent to the view count determination unit 34, the distribution/non-distribution decision unit 35, and the distribution request unit 36, which are included in the control unit 32 of the advertisement distribution control apparatus 3 illustrated in FIG. 7. In addition, the control unit 302 includes an advertisement distribution unit 405 equivalent to the advertisement distribution unit 45 included in the control unit 42 of the advertisement distribution apparatus 4 illustrated in FIG. 10, Such a configuration enables the advertisement distribution control apparatus 300 to also execute the advertisement distribution process. Although the illustration is omitted, it is also possible to cause the advertisement distribution control apparatuses 3 and 300 to have a content distribution function equivalent to the content distribution apparatus 2.

7. Hardware Configuration

Figure 16:
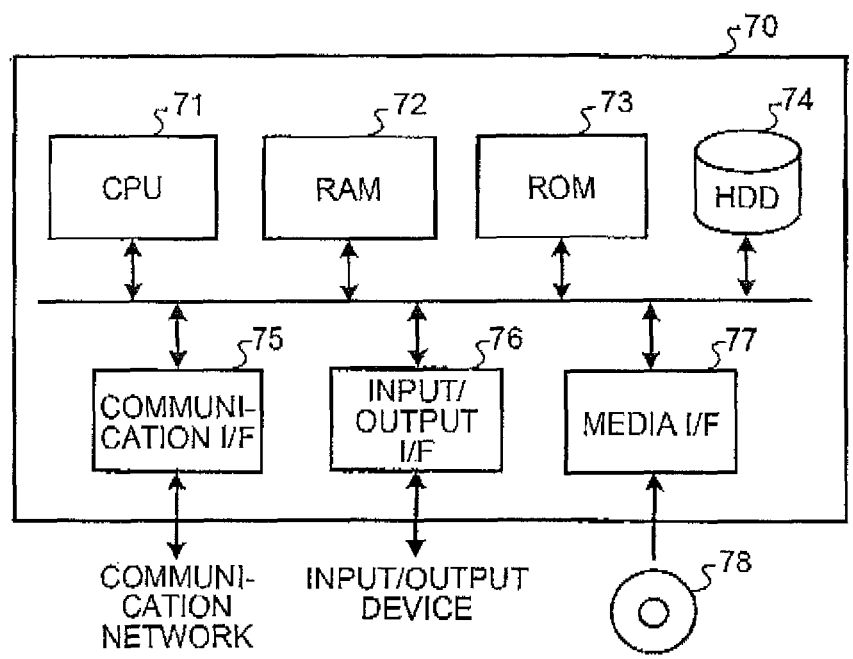

The content distribution apparatus 2, the advertisement distribution control apparatus 3, and the advertisement distribution apparatus 4 according to the embodiment are realized by, for example, a computer 70 with such a configuration as illustrated in FIG. 16. FIG. 16 is a hardware configuration diagram illustrating an example of a computer that realizes the functions of the advertisement distribution control apparatus 3. The content distribution apparatus 2 and the advertisement distribution apparatus 4 are also realized by the computer 70 with a similar configuration. The computer 70 includes a CPU (Central Processing Unit) 71, a RAM (Random Access Memory) 72, a ROM (Read Only Memory) 73, an HDD (Hard Disk Drive) 74, a communication interface (I/F) 75, an input/output interface (I/F) 76, and a media interface (I/F) 77.

The CPU 71 operates based on a program stored in the ROM 73 or the HDD 74, and controls each unit. A boot program to be executed by the CPU 71 at the startup of the computer 70, and a program dependent on the hardware of the computer 70, and the like are stored in the ROM 73.

A program to be executed by the CPU 71, data used by the program, and the like are stored in the HDD 74. The communication interface 75 corresponds to the communication unit 31, receives data from another device via the communication network 6, sends it to the CPU 71, and transmits data generated by the CPU 71 to another device via the communication network 6.

The CPU 71 controls output devices such as a display and a printer, and input devices such as a keyboard and a mouse via the input/output interface 76. The CPU 71 acquires data from the input device via the input/output interface 76. Moreover, the CPU 71 outputs the generated data to the output device via the input/output interface 76.

The media interface 77 reads a program or data stored in a recording medium 78, and provides it to the CPU 71 via the RAM 72. The CPU 71 loads the program into the RAM 72 from the recording medium 78 via the media interface 77, and executes the loaded program. The recording medium 78 is, for example, an optical recording medium such as a DVD (Digital Versatile Disc) or PD (Phase change rewritable Disk), a magneto-optical recording medium such as an MO (Magneto-Optical disk), a tape medium, a magnetic recording medium, or a semiconductor memory.

If the computer 70 functions as the advertisement distribution control apparatus 3, the CPU 71 of the computer 70 executes the program loaded into the RAM 72 to realize the functions of the view count determination unit 34, the distribution/non-distribution decision unit 35, and the distribution request unit 36. Moreover, the HDD 74 realizes the function of the storage unit 33. The user information 38, the advertisement-related information 39, and the like are stored in the HDD 74.

The CPU 71 of the computer 70 reads the programs from the recording medium 78 for execution, but may acquire the programs from another apparatus via the communication network 6 as another example.

8. Effects

The advertisement distribution control apparatus 3 of the advertisement distribution system 1 according to the embodiment includes the view count determination unit 34 and the distribution/non-distribution decision unit 35. The view count determination unit 34 determines the number of views N of content information being distributed from the content distribution apparatus 2. The distribution/non-distribution decision unit 35 decides whether or not to distribute advertisement information to the user terminals 5 viewing content information, based on the number of views N determined by the view count determination unit 34.

In this manner, the advertisement distribution control apparatus 3 can distribute advertisement information to the user terminals 5 viewing content information, based on the number of views N. Accordingly, it becomes possible to set an advertising rate and the like rationally. Moreover, if an advertisement is distributed when the number of views N is large, the improvement of the appeal effect by advertising can be expected.

Moreover, the distribution/non-distribution decision unit 35 of the advertisement distribution control apparatus 3 decides whether a distribution timing (such as the advertising spot C1 or C2) determined according to the content information is right or wrong.

Consequently, for example, a timing to distribute an advertisement is also predetermined at an appropriate slot according to the content information to be distributed. Accordingly, there is no possibility to distribute the advertisement at a timing to hurt the viewer's feeling.

Moreover, the advertisement distribution control apparatus 3 includes the distribution, request unit 36 that outputs a distribution request to cause advertisement information to be distributed to the terminal apparatus, based on the distribution/non-distribution decision by the distribution/non-distribution decision unit 35.

Consequently, even if the advertisement distribution control apparatus 3 itself does not have the content distribution function and the advertisement distribution function, an advertisement can be effectively distributed using the content distribution apparatus (such as web server) 2, the advertisement distribution apparatus (advertising distributor) 4, and the like, which are provided separately.

Moreover, the advertisement distribution control apparatus 3 includes the advertisement distribution unit 405 that distributes advertisement information to the user terminal 5 if accepting a distribution request output by the distribution request unit 36.

Consequently, it becomes possible to effectively distribute an advertisement only by the advertisement distribution control apparatus 3 not via the advertisement distribution apparatus (advertising distributor) 4 from the viewpoint of the system. Therefore, for example, a media company includes the advertisement distribution control apparatus 3 to enable the promotion of an increase in the revenue of the media company.

Moreover, the distribution/non-distribution decision unit 35 of the advertisement distribution control apparatus 3 decides whether or not to distribute advertisement information based on the number of views N according to each attribute of users using the user terminals 5 viewing content information.

Consequently, an advertisement can be provided to more people in a user base considered to have a high demand for an advertising product. Accordingly, an advertisement can be distributed more effectively.

Moreover, the distribution request unit 36 of the advertisement distribution control apparatus 3 outputs a distribution request to cause advertisement information associated with the number of views N and the attributes of a user using the user terminal 5 viewing content information to be distributed to the user terminal 5.

Consequently, it becomes possible to provide more appropriate advertisement information to more users viewing the content, and to distribute the advertisement more carefully.

Moreover, the advertisement distribution control apparatus 3 includes the distribution timing decision unit that decides a timing to distribute advertisement information to the user terminal 5 based on the number of views N determined by the view count determination unit 34.

Such a configuration-enables careful advertisement distribution. Accordingly, the improvement of the advertising effect can be expected.

Moreover, the distribution request unit 36 of the advertisement distribution control apparatus 3 outputs a distribution request in tune with a distribution timing decided by the distribution timing decision unit.

Consequently, even if an advertisement is simply provided to content information, the advertising effect can be increased since the advertisement can be distributed when, for example, the number of views is large so that more viewers see the advertisement. Therefore, for example, it also becomes possible to make an advantageous advertisement distribution contract with an advertiser.

The view count determination unit 34 of the advertisement distribution control apparatus 3 determines the number of the user terminals 5 whose continuous viewing time of content information is equal to or more than a predetermined time among a plurality of user terminals 5 viewing the content information, as the number of views N used to decide the distribution timing of advertisement information.

Consequently, an advertisement can be provided based on the actual number of views N from which zapping and the like are excluded.

The view count determination unit 34 of the advertisement distribution control apparatus 3 divides a distribution period of content information into a plurality of unit periods, and determines the average number of views of the content information within each divided unit period, as the number of views N used to decide the distribution timing of advertisement information.

Consequently, an advertisement can be provided, based on the actual number of views N from which zapping and the like are excluded.

The distribution start time of content information to be distributed from the content distribution apparatus 2 is assumed to be predetermined. In other words, the content information can be video content to be distributed in real time as in live distribution.

Therefore, for example, advertisement distribution control appealing to an advertiser or the like can be performed. Accordingly, it also becomes possible to make an advantageous advertisement distribution contract with the advertiser.

9. Others

Up to this point some embodiments of the present application have been described in detail with reference to the drawings. However, they are illustrative examples. The present invention can be embodied in the aspects described in the disclosure of the invention, and also in another form by making various modifications and improvements based on the knowledge of those skilled in the art.

The above-mentioned content distribution apparatus 2, advertisement distribution control apparatus 3, and advertisement distribution apparatus 4 may be realized, for example, by a plurality of server computers, or by invoking an external platform or the like through an API (Application Programming Interface), network computing, or the like depending on the function. Their configurations can be flexibly changed.

An aspect of the embodiment can provide an advertisement distribution system, advertisement distribution control apparatus, advertisement distribution control method, and advertisement distribution control program that can distribute advertisement information more effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement distribution control apparatus comprising:
a processor programmed to:
receive viewing requests from respective terminal devices when a content distribution apparatus receives the viewing requests from browsers of the respective terminal devices, each of the viewing requests including same content information and identification information of a corresponding terminal device of the terminal devices, and the content distribution apparatus including a web server;
determine a number of views of the same content information by summing the viewing requests including the same content information;
acquire advertising spot information corresponding to the same content information from the content distribution apparatus;
determine whether the number of views of the same content information exceeds a predetermined threshold value;
determine whether distribution and display of the advertisement information on a display of each of the terminal devices interferes with viewing of the content information;
in response to determining that the number of views exceeds the predetermined threshold value, request an advertisement distribution apparatus to distribute the advertisement information to the terminal devices viewing the content information; and
in response to determining that the number of views exceeds the predetermined threshold value, request the content distribution apparatus to:
upon determining that distribution of the advertisement information will not interfere with viewing of the content information, stop distributing the content information for a predetermined time so that the display of each of the terminal devices displays the advertisement information without displaying the content information by receiving a web page including the advertisement information from the advertisement distribution apparatus; and
upon determining that distribution of the advertisement information will interfere with viewing of the content information, continue distributing the content information for the predetermined time so that the display of each of the terminal devices together displays both the content information and the advertisement information by generating a web page obtained by combining a web page including the content information and a web page including the advertisement information, the content information and the advertisement information being displayed simultaneously in different display areas of the display of each of the terminal devices such that a display area of the content information and a display area of the advertisement information do not interfere with each other on the display of each of the terminal devices.

2. The advertisement distribution control apparatus according to claim 1, wherein the processor is programmed to determine whether a distribution timing of the advertisement information determined in accordance with the content information is right or wrong.

3. The advertisement distribution control apparatus according to claim 1, wherein the processor is programmed to output the distribution request to cause the advertisement information to be distributed to the terminal device based on the determination of whether or not to distribute the advertisement information.

4. The advertisement distribution control apparatus according to claim 3, wherein the processor is programmed to distribute the advertisement information to the terminal device upon acceptance of the distribution request.

5. The advertisement distribution control apparatus according to claim 3, wherein the processor is programmed to output the distribution request to cause advertisement information associated with the number of views, and the attributes of users using the terminal devices viewing the content information to be distributed to the terminal devices.

6. The advertisement distribution control apparatus according to claim 1, wherein the processor is programmed to determine whether or not to distribute the advertisement information, based on the number of views according to each attribute of users using terminal devices viewing the content information.

7. The advertisement distribution control apparatus according to claim 1, wherein the processor is programmed to decide a timing to distribute the advertisement information to the terminal device based on the number of views.

8. The advertisement distribution control apparatus according to claim 7, wherein the processor is programmed to output the distribution request to cause the advertisement information to be distributed to the terminal device, based on the determination of whether or not to distribute the advertisement information, wherein the distribution request is output in accordance with a distribution timing.

9. The advertisement distribution control apparatus according to claim 1, wherein the processor is programmed to determine a number of terminal devices whose continuous viewing time of the content information is equal to or more than a predetermined time among a plurality of terminal devices viewing the content information, as the number of views used to decide whether or not to distribute the advertisement information.

10. The advertisement distribution control apparatus according to claim 1, wherein the processor is programmed to divide a distribution period of the content information into a plurality of unit periods, and determine an average number of views of the content information within each divided unit period as the number of views used to decide a distribution timing of the advertisement information.

11. The advertisement distribution control apparatus according to claim 1, wherein a distribution start time of the content information is predetermined.

12. An advertisement distribution system comprising:
a content distribution apparatus configured to distribute content information to a plurality of terminal devices;
an advertisement distribution apparatus configured to distribute advertisement information to the plurality of terminal devices; and
an advertisement distribution control apparatus configured to output a distribution request to the advertisement distribution apparatus and cause the advertisement information to be distributed to the terminal devices, the advertisement distribution control apparatus including a processor programmed to:
receive viewing requests from respective terminal devices when the content distribution apparatus receives the viewing requests from browsers of the respective terminal devices, each of the viewing requests including same content information and identification information of a corresponding terminal device of the terminal devices, and the content distribution apparatus including a web server;
determine a number of views of the same content information by summing the viewing requests including the same content information;
acquire advertising spot information corresponding to the same content information from the content distribution apparatus;
determine whether the number of views of the same content information exceeds a predetermined threshold value;
determine whether distribution and display of the advertisement information on a display of each of the terminal devices interferes with viewing of the content information;
in response to determining that the number of views exceeds the predetermined threshold value, request the advertisement distribution apparatus to distribute the advertisement information to the terminal devices viewing the content information; and
in response to determining that the number of views exceeds the predetermined threshold value, request the content distribution apparatus to:
upon determining that distribution of the advertisement information will not interfere with viewing of the content information, stop distributing the content information for a predetermined time so that the display of each of the terminal devices displays the advertisement information without displaying the content information by receiving a web page including the advertisement information from the advertisement distribution apparatus; and
upon determining that distribution of the advertisement information will interfere with viewing of the content information, continue distributing the content information for the predetermined time so that the display of each of the terminal devices together displays both the content information and the advertisement information by generating a web page obtained by combining a web page including the content information and a web page including the advertisement information, the content information and the advertisement information being displayed simultaneously in different display areas of the display of each of the terminal devices such that a display area of the content information and a display area of the advertisement information do not interfere with each other on the display of each of the terminal devices.

13. An advertisement distribution control method to be executed by a computer, the method comprising:
receiving viewing requests from respective terminal devices when a content distribution apparatus receives the viewing requests from browsers of the respective terminal devices, each of the viewing requests including same content information and identification information of a corresponding terminal device of the terminal devices, and the content distribution apparatus including a web server;
determining a number of views of the same content information by summing the viewing requests including the same content information;
acquiring advertising spot information corresponding to the same content information from the content distribution apparatus;
determining whether the number of views of the same content information exceeds a predetermined threshold value;
determining whether distribution and display of the advertisement information on a display of each of the terminal devices interferes with viewing of the content information;
in response to determining that the number of views exceeds the predetermined threshold value, requesting an advertisement distribution apparatus to distribute the advertisement information to the terminal devices viewing the content information; and
in response to determining that the number of views exceeds the predetermined threshold value, requesting the content distribution apparatus to:
upon determining that distribution of the advertisement information will not interfere with viewing of the content information, stop distributing the content information for a predetermined time so that the display of each of the terminal devices displays the advertisement information without displaying the content information by receiving a web page including the advertisement information from the advertisement distribution apparatus; and upon determining that distribution of the advertisement information will interfere with viewing of the content information, continue distributing the content information for the predetermined time so that the display of each of the terminal devices together displays both the content information and the advertisement information by generating a web page obtained by combining a web page including the content information and a web page including the advertisement information, the content information and the advertisement information being displayed simultaneously in different display areas of the display of each of the terminal devices such that a display area of the content information and a display area of the advertisement information do not interfere with each other on the display of each of the terminal devices.

14. A non-transitory computer readable storage medium containing program instructions for controlling an advertisement distribution, wherein execution of the program instructions by one or more processors of a computer system causes the one or more processors to perform:

receiving viewing requests from respective terminal devices when a content distribution apparatus receives the viewing requests from browsers of the respective terminal devices, each of the viewing requests including same content information and identification information of a corresponding terminal device of the terminal devices, and the content distribution apparatus including a web server;

determining a number of views of the same content information by summing the viewing requests including the same content information;

acquiring advertising spot information corresponding to the same content information from the content distribution apparatus;

determining whether the number of views of the same content information exceeds a predetermined threshold value;

determining whether distribution and display of the advertisement information on a display of each of the terminal devices interferes with viewing of the content information;

in response to determining that the number of views exceeds the predetermined threshold value, requesting an advertisement distribution apparatus to distribute the advertisement information to the terminal devices viewing the content information; and in response to determining that the number of views exceeds the predetermined threshold value, requesting the content distribution apparatus to:

upon determining that distribution of the advertisement information will not interfere with viewing of the content information, stop distributing the content information for a predetermined time so that the display of each of the terminal devices displays the advertisement information without displaying the content information by receiving a web page including the advertisement information from the advertisement distribution apparatus; and upon determining that distribution of the advertisement information will interfere with viewing of the content information, continue distributing the content information for the predetermined time so that the display of each of the terminal devices together displays both the content information and the advertisement information by generating a web page obtained by combining a web page including the content information and a web page including the advertisement information, the content information and the advertisement information being displayed simultaneously in different display areas of the display of each of the terminal devices such that a display area of the content information and a display area of the advertisement information do not interfere with each other on the display of each of the terminal devices.

* * * * *